Feb. 18, 1941.  W. P. SCHMITTER  2,232,637
COUPLING
Filed Jan. 24, 1938
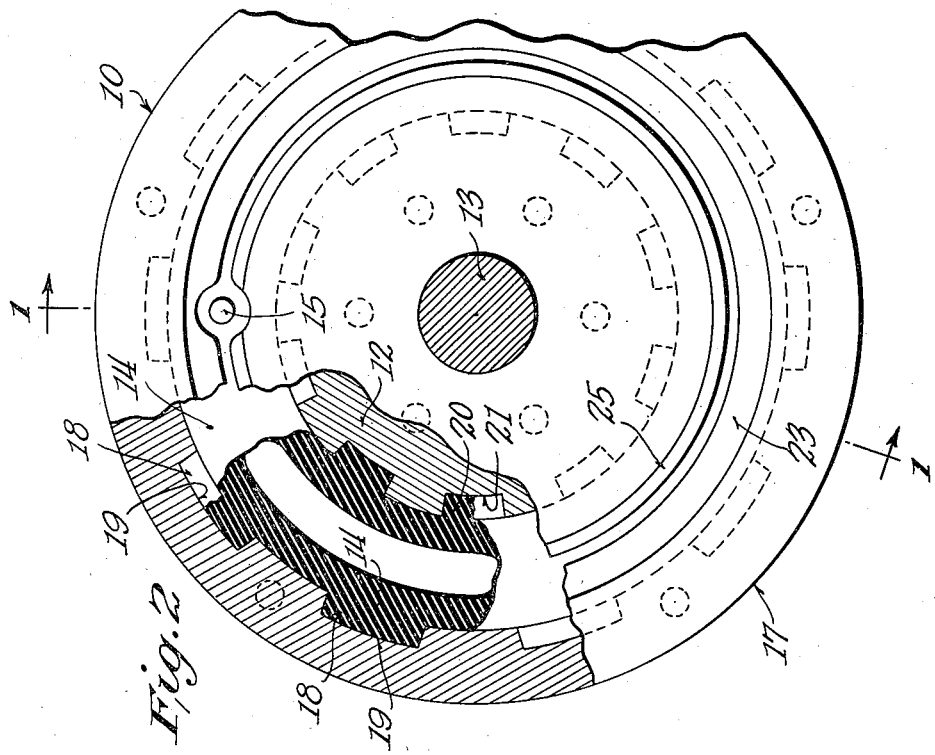
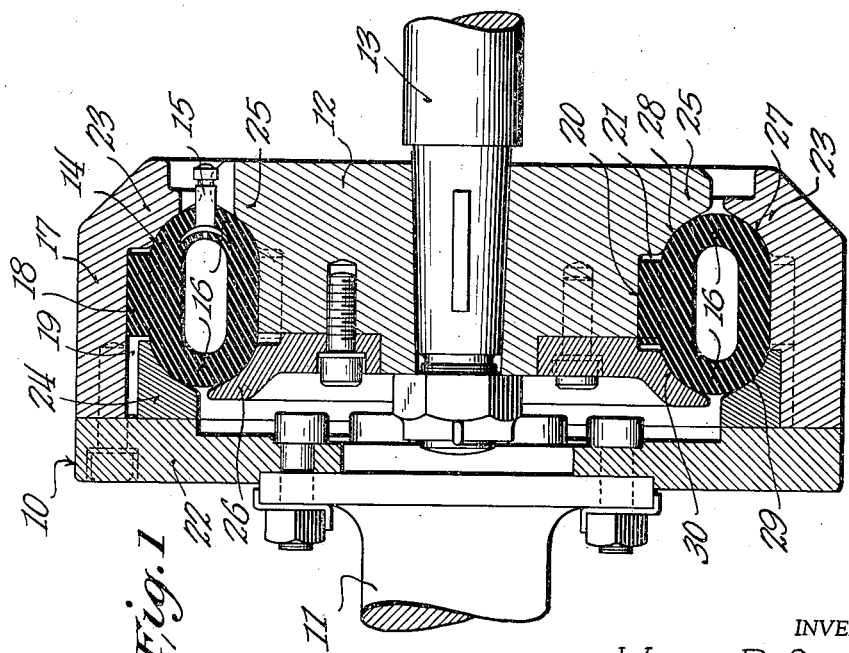
INVENTOR,
WALTER P. SCHMITTER
BY
ATTORNEY.

Patented Feb. 18, 1941

2,232,637

UNITED STATES PATENT OFFICE 2,232,637

COUPLING

Walter P. Schmitter, Milwaukee, Wis., assignor to The Falk Corporation, Milwaukee, Wis., a corporation of Wisconsin Application January 24, 1938, Serial No. 186,512

7 Claims. (Cl. 64—11)

This invention relates to flexible couplings.

An object of the present invention is to provide a flexible coupling capable of sustaining a substantial end thrust and of accommodating misalignment between the coupled shafts without developing sliding friction and consequent wear between the coupling parts.

Another object is to provide a flexible coupling possessing the above functional characteristics and capable of ready separation to release the same.

Other more specific objects and advantages will appear, expressed or implied, from the following description of an illustrative embodiment of the invention.

In the accompanying drawing:

Figure 1 is an axial sectional view, taken on the line 1—1 of Fig. 2, of a flexible coupling constructed in accordance with the present invention.

Fig. 2 is an end elevation, partly in section, of the coupling shown in Fig. 1.

The coupling selected for illustration is designed for marine use and comprises a drum or bell 10 attached to an axially fixed drive shaft 11, a substantially cylindrical coupling head 12 fixed to a propeller shaft 13 and encircled by the bell 10, and an annular pneumatic cushion 14 interposed between the head 12 and bell 10.

The annular cushion 14 preferably comprises a tube of multiple-ply cord-and-rubber construction, such as that commonly employed in modern pneumatic tire casings, the tube being equipped with an air valve 15 of well known type through which the tube may be inflated and deflated. The tube is preferably somewhat flattened radially so that, when inflated, the outer periphery thereof is forcibly pressed into driving engagement with the interior of the bell 10 by the fluid pressure in the tube, the inner periphery thereof being similarly pressed into driving engagement with the head 12, and so that the bulging side walls 16 thereof, although capable of transmitting the torque load between the bell and head, are sufficiently flexible to accommodate such relative movements between bell and head as may result from misalignment between the shafts.

In the coupling shown, the annular cushion is interlocked with the bell 10 and head 12 to assure a positive grip therebetween and in such manner as to permit axial withdrawal of the skirt portion 17 of the bell from the cushion when the fluid pressure in the cushion is released, thereby to separate and release the coupling. For this purpose the cushion is provided with a series of lugs 18 molded on its outer periphery and adapted to fit in transverse channels 19 provided in the bell 10, and also with a similar series of lugs 20 on its inner periphery adapted to fit in transverse channels 21 formed in the head 12. In this instance the substantially cylindrical skirt portion 17 of the bell 10 is separably secured to the supporting disk portion 22 thereof by bolts or otherwise and the lug receiving channels 19 therein are extended so that, when the skirt portion is released from the disk it may be axially withdrawn clear of the annular cushion.

In the coupling shown, the outer periphery of the annular cushion is normally axially confined by and between an inturned shoulder 23, formed on that edge of the skirt 17 remote from the disk 22, and a ring 24, interposed between the disk and cushion. The ring 24 is preferably of split form to permit ready separation and removal thereof after axial withdrawal of the skirt 17. Likewise the inner periphery of the cushion is axially confined by and between an upstanding shoulder 25 formed on one end of the head 12 and a ring 26 detachably fixed to the other end of the head. Inclined faces 27 and 28 on the shoulders 23 and 25, respectively, are curved to normally make only partial contact with one of the side walls 16 of the cushion along narrow annular areas adjacent the junction of that wall with the outer and inner peripheries of the cushion, so as to leave a substantial intermediate portion of the side wall unconfined and free to flex. Similarly formed inclined faces 29 and 30 on the rings 24 and 26, respectively, normally contact the other side wall 16 in like manner.

With the inclined faces arranged in the manner above described, faces 28 and 29 coact with the cushion 14 to sustain any end thrust tending to force the propeller shaft 13 toward the coupling, and in so doing any consequent deformation of the cushion causes an increase in the areas of contact of the pressure sustaining faces 28 and 29 with the cushion and a corresponding decrease in the areas of contact of the faces 27 and 30 with the cushion, thereby maintaining substantial portions of the side walls 16 unconfined and free to flex. The inclined faces 27 and 30 coact in like manner to sustain any end thrust tending to force the propeller shaft away from the coupling while maintaining substantial portions of the side walls 16 unconfined and free to flex. The coupling shown is thus well able to sustain a substantial axial thrust in either direction and at the same time preserve the flexibility necessary to compensate for shaft misalignment.

Various changes may be made in the embodiment of the invention hereinabove specifically described without departing from or sacrificing the advantages of the invention as defined in the appended claims.

I claim:

1. In a flexible coupling the combination of a coupling member, a second coupling member substantially encircled thereby, a readily deformable annular cushion interposed between said members and peripherally engaged in driving relation therewith to form a torque transmitting flexible connection therebetween, and means on said members engaging diagonally opposite limited portions of the annulus of said cushion to sustain an axial thrust and leaving other substantial portions of said cushion unconfined to substantially preserve the deformability of said cushion, said means including surfaces shaped to vary the area of contact thereof with said annulus in accordance with the magnitude and direction of the thrust.

2. In a flexible coupling the combination of a coupling member, a second coupling member substantially encircled thereby, a deformable annular fluid container interposed between said members and peripherally engaged therewith to form a torque transmitting flexible connection therebetween, and means on said members engaging diagonally opposite limited portions of the annulus of said fluid pressure container to sustain an axial thrust and leaving other substantial side wall portions of said fluid pressure container unrestrained and free to flex, said means including surfaces shaped to vary the area of contact thereof with said annulus in accordance with the magnitude and direction of the thrust.

3. In a flexible coupling the combination of a coupling member, a second coupling member substantially encircled thereby, a deformable annular fluid pressure container interposed between said members and peripherally engaged in driving relation therewith, said fluid pressure container having torque transmitting side wall portions normally unconfined and free to flex, and inclined surfaces on said members normally in partial contact with diagonally opposite portions of the annulus of said container, and coacting therewith to sustain an axial thrust, said surfaces being shaped to vary the areas of contact with said annulus in accordance with variations in the magnitude of the thrust.

4. In a flexible coupling the combination of a coupling member, a second coupling member substantially encircled thereby, a deformable annular fluid pressure container interposed and peripherally engaged with said members to form a torque transmitting flexible connection therebetween, opposed inclined surfaces on the respective members normally in partial contact with diagonally opposite portions of the annulus of said container to sustain an axial thrust in one direction, additional opposed inclined surfaces on the respective members normally in partial contact with other diagonally opposite portions of said annulus to sustain an axial thrust in the opposite direction, said surfaces being shaped to vary the areas of contact thereof with said annulus in accordance with the magnitude and direction of the thrust.

5. In a flexible coupling the combination of driving and driven shafts, a coupling member fixed to one shaft, a second coupling member fixed to the other shaft and substantially encircled by said first named member, a deformable annular cushion interposed between and peripherally interlocked with said members to drive one from the other, and spaced thrust sustaining means on each member between which said cushion is axially confined, said means being disposed to bear against portions of the side walls of said cushion to transmit the axial thrust thereto and being separable to permit axial separation of said members with respect to said cushion.

6. The combination of driving and driven shafts, a coupling member on one of said shafts, a second coupling member on the other of said shafts and substantially encircled by said first named member, a deformable annular cushion interposed between and peripherally engaged with said members to drive one from the other, and spaced means on each of said members coacting with portions of the side walls of said cushion to sustain axial thrusts, said means being separable to permit axial separation of said members with respect to said cushion.

7. In a flexible coupling the combination of a coupling member, a second coupling member substantially encircled thereby, a deformable annular cushion interposed between said members to drive one from the other, axially extending lugs on the peripheries of said cushion and on the peripheries of each of said members interlocked to form a positive driving connection while permitting rolling of said cushion axially of said members, and means on said members bearing against diagonally opposite portions of the side walls of said cushion for sustaining an axial thrust.

WALTER P. SCHMITTER.